(12) United States Patent
Wang et al.

(10) Patent No.: US 12,198,357 B2
(45) Date of Patent: Jan. 14, 2025

(54) DENSE FEATURE SCALE DETECTION FOR IMAGE MATCHING

(71) Applicant: Snap Inc., Santa Monica, CA (US)

(72) Inventors: Shenlong Wang, Toronto (CA); Linjie Luo, Los Angeles, CA (US); Ning Zhang, Los Angeles, CA (US); Jia Li, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/367,034

(22) Filed: Sep. 12, 2023

(65) Prior Publication Data

US 2023/0419512 A1   Dec. 28, 2023

Related U.S. Application Data

(63) Continuation of application No. 17/825,994, filed on May 26, 2022, now Pat. No. 11,861,854, which is a
(Continued)

(51) Int. Cl.
*G06T 7/246*   (2017.01)
*G06T 7/33*   (2017.01)
(Continued)

(52) U.S. Cl.
CPC .............. *G06T 7/248* (2017.01); *G06T 7/33* (2017.01); *G06V 10/454* (2022.01);
(Continued)

(58) Field of Classification Search
None
See application file for complete search history.

(56) References Cited

U.S. PATENT DOCUMENTS 5,754,939 A   5/1998   Herz et al.
5,845,009 A   12/1998   Marks et al.
(Continued)

FOREIGN PATENT DOCUMENTS

CA       2887596 A1    7/2015
WO   WO-2012000107 A1    1/2012
(Continued)

OTHER PUBLICATIONS

"U.S. Appl. No. 15/712,990, Non Final Office Action mailed Mar. 19, 2019", 7 pgs.
(Continued)

*Primary Examiner* — Leon Viet Q Nguyen
(74) *Attorney, Agent, or Firm* — Schwegman Lundberg & Woessner, P.A.

(57) ABSTRACT

Dense feature scale detection can be implemented using multiple convolutional neural networks trained on scale data to more accurately and efficiently match pixels between images. An input image can be used to generate multiple scaled images. The multiple scaled images are input into a feature net, which outputs feature data for the multiple scaled images. An attention net is used to generate an attention map from the input image. The attention map assigns emphasis as a soft distribution to different scales based on texture analysis. The feature data and the attention data can be combined through a multiplication process and then summed to generate dense features for comparison.

20 Claims, 20 Drawing Sheets

Related U.S. Application Data continuation of application No. 16/721,483, filed on Dec. 19, 2019, now Pat. No. 11,367,205, which is a continuation of application No. 15/712,990, filed on Sep. 22, 2017, now Pat. No. 10,552,968.

(60) Provisional application No. 62/399,171, filed on Sep. 23, 2016.

(51) Int. Cl.
    *G06V 10/44*      (2022.01)
    *G06V 10/764*     (2022.01)
    *G06V 10/82*      (2022.01)
    *G06T 7/40*       (2017.01)

(52) U.S. Cl.
    CPC ............ *G06V 10/764* (2022.01); *G06V 10/82* (2022.01); *G06T 7/40* (2013.01); *G06T 2207/20084* (2013.01)

(56) References Cited

U.S. PATENT DOCUMENTS

| | | | |
|---|---|---|---|
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,874,677 B2 | 10/2014 | Rosen et al. | |
| 8,897,578 B2 | 11/2014 | Huang et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,424,461 B1 | 8/2016 | Yuan et al. | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,870,617 B2 | 1/2018 | Piekniewski et al. | |
| 9,961,520 B2 | 5/2018 | Brooks et al. | |
| 10,489,691 B2 * | 11/2019 | Schrier | G06T 5/70 |
| 10,552,968 B1 | 2/2020 | Wang et al. | |
| 11,367,205 B1 | 6/2022 | Wang et al. | |
| 11,861,854 B2 | 1/2024 | Wang et al. | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0042656 A1 | 3/2004 | Timor et al. | |
| 2004/0203959 A1 | 10/2004 | Coombes | |
| 2005/0047647 A1 | 3/2005 | Rutishauser et al. | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2006/0280341 A1 | 12/2006 | Koshizen et al. | |
| 2007/0025637 A1 | 2/2007 | Setlur et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0304740 A1 * | 12/2008 | Sun | G06V 10/457 382/168 |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2009/0208118 A1 | 8/2009 | Csurka | |
| 2010/0082427 A1 | 4/2010 | Burgener et al. | |
| 2010/0131880 A1 | 5/2010 | Lee et al. | |
| 2010/0185665 A1 | 7/2010 | Horn et al. | |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0286586 A1 | 11/2011 | Saylor et al. | |

(56) References Cited

U.S. PATENT DOCUMENTS

| | | |
|---|---|---|
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0177906 A1 | 6/2014 | Horowitz |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0036931 A1 | 2/2015 | Loui et al. |
| 2015/0199082 A1 | 7/2015 | Scholler et al. |
| 2015/0227602 A1 | 8/2015 | Ramu et al. |
| 2016/0034786 A1 | 2/2016 | Suri et al. |
| 2016/0085773 A1 | 3/2016 | Chang et al. |
| 2016/0085863 A1 | 3/2016 | Allen et al. |
| 2016/0086050 A1 | 3/2016 | Piekniewski et al. |
| 2016/0086670 A1 | 3/2016 | Gross et al. |
| 2016/0099901 A1 | 4/2016 | Allen et al. |
| 2016/0104055 A1 | 4/2016 | Lin et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0124432 A1 | 5/2017 | Chen et al. |
| 2017/0161382 A1 | 6/2017 | Ouimet et al. |
| 2017/0262995 A1 | 9/2017 | Li et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0374003 A1 | 12/2017 | Allen et al. |
| 2017/0374508 A1 | 12/2017 | Davis et al. |
| 2018/0007444 A1 | 1/2018 | Li et al. |
| 2018/0144248 A1 | 5/2018 | Lu et al. |
| 2018/0165539 A1* | 6/2018 | Park .................... G06V 10/82 |
| 2022/0292697 A1 | 9/2022 | Wang et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 15/712,990, Notice of Allowance mailed Sep. 12, 2019", 7 pgs.

"U.S. Appl. No. 15/712,990, Response filed Jun. 17, 2019—to Non Final Office Action mailed Mar. 19, 2019", 10 pgs.

"U.S. Appl. No. 16/721,483, Non Final Office Action mailed Sep. 30, 2021", 11 pgs.

"U.S. Appl. No. 16/721,483, Notice of Allowance mailed Feb. 22, 2022", 7 pgs.

"U.S. Appl. No. 16/721,483, Preliminary Amendment filed Jun. 23, 2020", 6 pgs.

"U.S. Appl. No. 16/721,483, Response filed Dec. 28, 2021 to Non Final Office Action mailed Sep. 30, 2021".

"U.S. Appl. No. 17/825,994, Non Final Office Action mailed Mar. 28, 2023", 22 pgs.

"U.S. Appl. No. 17/825,994, Notice of Allowance mailed Aug. 21, 2023", 8 pgs.

"U.S. Appl. No. 17/825,994, Response filed Jun. 28, 2023 to Non Final Office Action mailed Mar. 28, 2023", 9 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptit>, (Dec. 13, 2005), 2 pgs.

* cited by examiner

DENSE FEATURE SCALE DETECTION FOR IMAGE MATCHING

CLAIM OF PRIORITY

This application is a continuation of and claims the benefit of priority of U.S. patent application Ser. No. 17/825,994, filed May 26, 2022, which is a continuation of and claims the benefit of priority of U.S. patent application Ser. No. 16/721,483, filed Dec. 19, 2019, now issued as U.S. Pat. No. 11,367,205, which is a continuation of and claims the benefit of priority of U.S. patent application Ser. No. 15/712,990, filed Sep. 22, 2017, now issued as U.S. Pat. No. 10,552,968, which claims the benefit of priority of U.S. Patent Application Ser. No. 62/399,171, filed on Sep. 23, 2016, each of which are hereby incorporated by reference herein in their entireties.

TECHNICAL FIELD

Embodiments of the present disclosure relate generally to machine learning and image processing and, more particularly, but not by way of limitation, to dense feature scale detection for imaging matching.

BACKGROUND

Matching an object depicted in multiple images is a useful operation in the image, video, and animation arts. In some approaches, pixels of a source image and pixels of a target image are compared against one another to identify the depicted object. The task of matching or tracking a depicted object in different images is more complex when the object's orientation or scale has changed. For example, assume the first image depicts an approaching car that is off in the distance, and a second image depicts the same car a moment later, closer (and thus larger in appearance). In the example, the car changed both its orientation within the image and also its scale. In some conventional approaches, e.g., scale-invariant feature transform (SIFT), a local feature computer vision algorithm is applied to match an object (e.g., a car) depicted in a first image to the object in a second image. However, SIFT uses edges and blobs to track objects and does not work well if the object being has smooth surfaces.

BRIEF DESCRIPTION OF THE SEVERAL VIEWS OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, tracking one or more objects, (e.g., a car), moving within images captured in sequence (e.g., video) can be implemented using one or more convolutional neural networks trained on images of different sizes, where each image of a given size has texture data emphasized via an attention map. The one or more convolutional neural networks can implement the images and the attention net to more accurately and efficiently match pixels between images to track the object. Once the object is tracked, image manipulation effects can be performed on the object in the entire image sequence seamlessly. For example, a video sequence of a red car traveling down the street can be tracked via the above approach, and the car may recolored as blue. The resulting image sequence depicting the blue car can published on a social media network as an ephemeral message, as discussed in further detail below.

Figure 1:
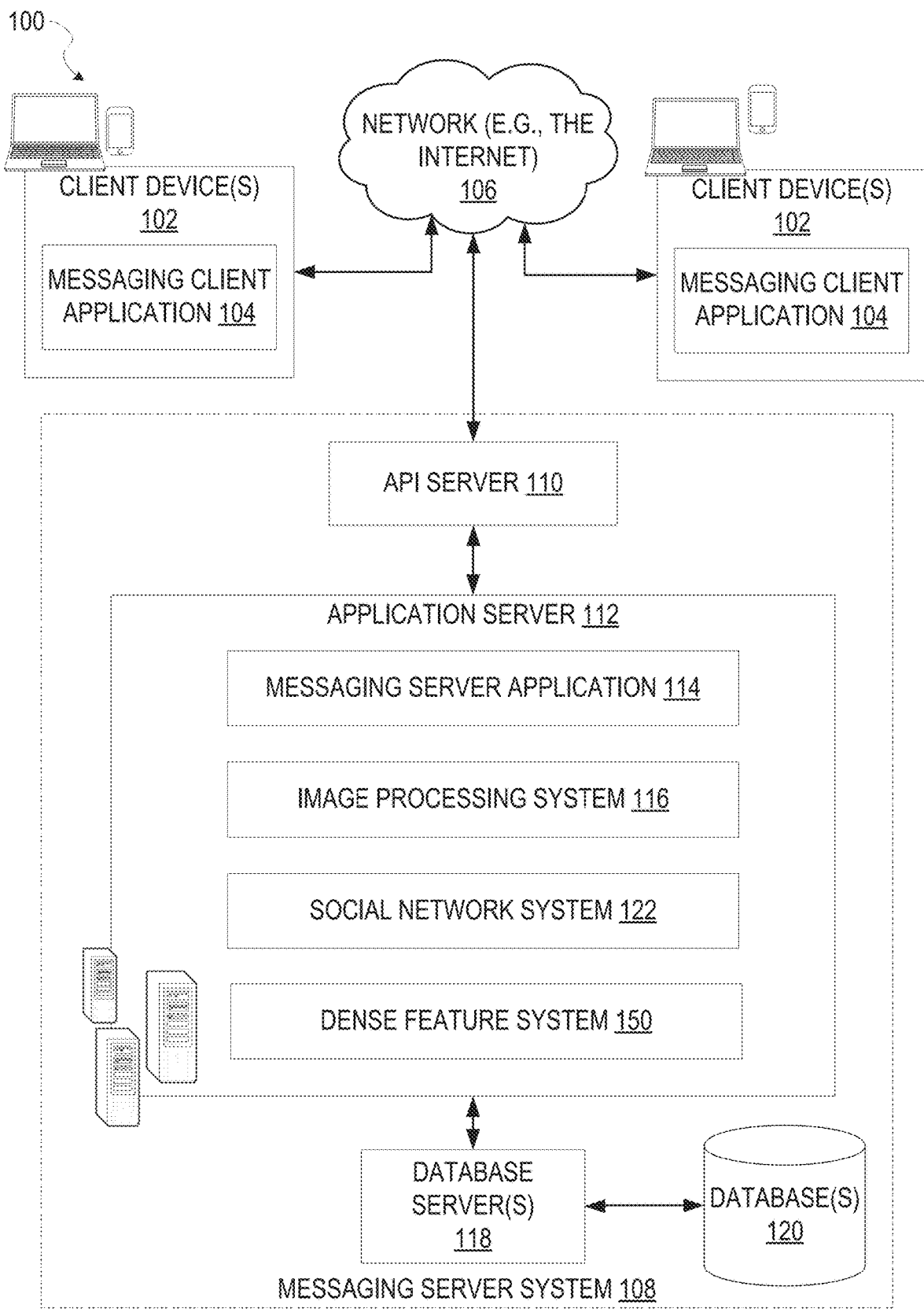
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening and application events (e.g., relating to the messaging client application 104).

The application server 112 hosts a number of applications and subsystems, including the messaging server application 114, an image processing system 116, a social network system 122, and a dense feature system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following", and also the identification of other entities and interests of a particular user.

The dense feature system 150 manages tracking an object in different images, according to some example embodiments. Further details of the dense feature system 150 are discussed below with reference to FIGS. 6-15. Although the dense feature system 150 is illustrated in FIG. 1 as being integrated into the application server 112, it is appreciated that in some example embodiments, the dense feature system 150 is integrated into other systems, such as the client device 102. Further, in some example embodiments, some engines of the dense feature system 150 may be integrated into the application server 112 and some may be integrated into the client device 102. For example, the neural network (discussed below) may be trained on application server 112 and the trained model may then transmitted to client device 102 for client-side execution to track of objects in images generated by the client device 102.

The application server 112 is communicatively coupled to a database server 118, which facilitates access to a database 120 in which is stored data associated with messages processed by the messaging server application 114.

Figure 2:
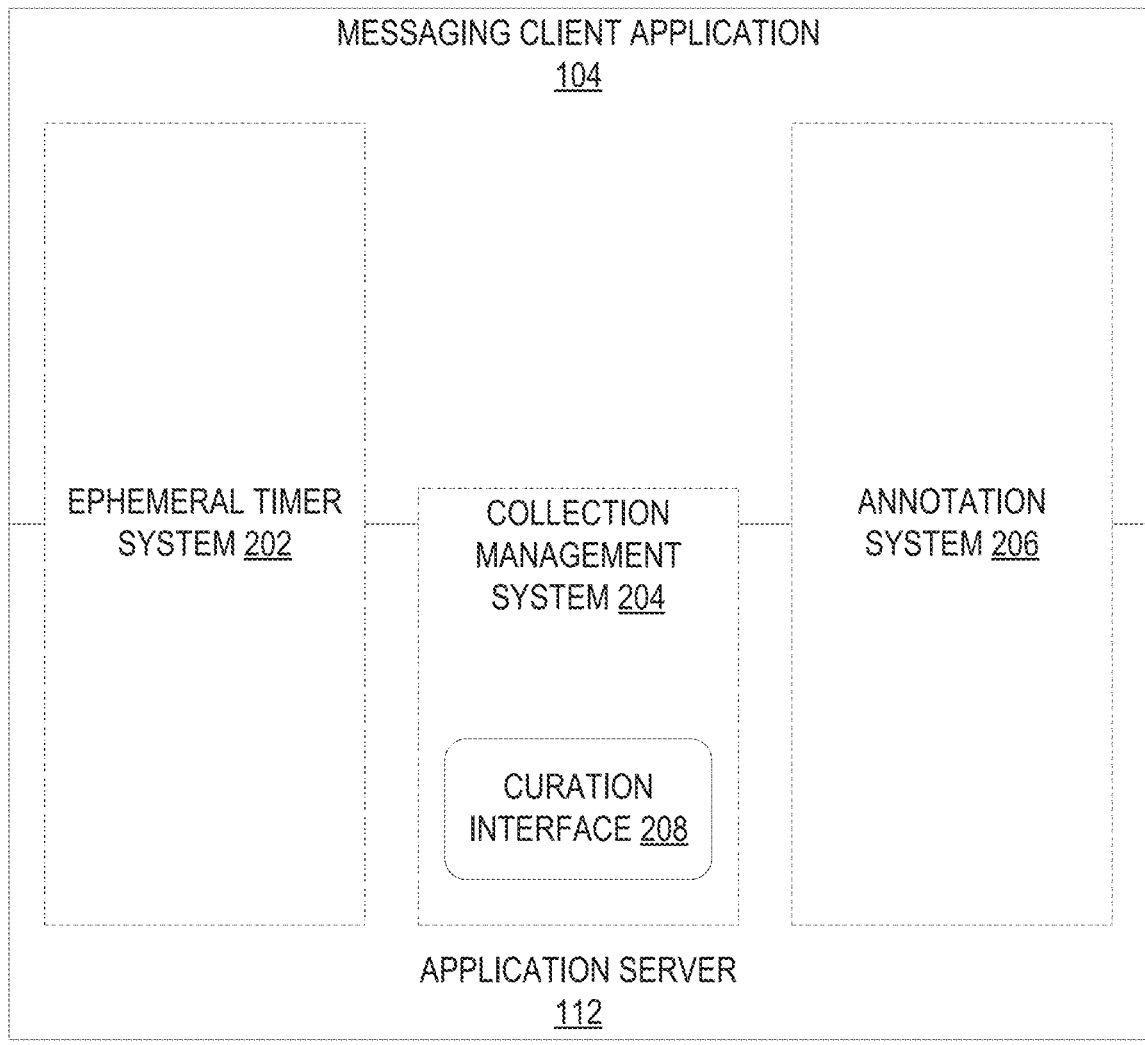
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story". Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
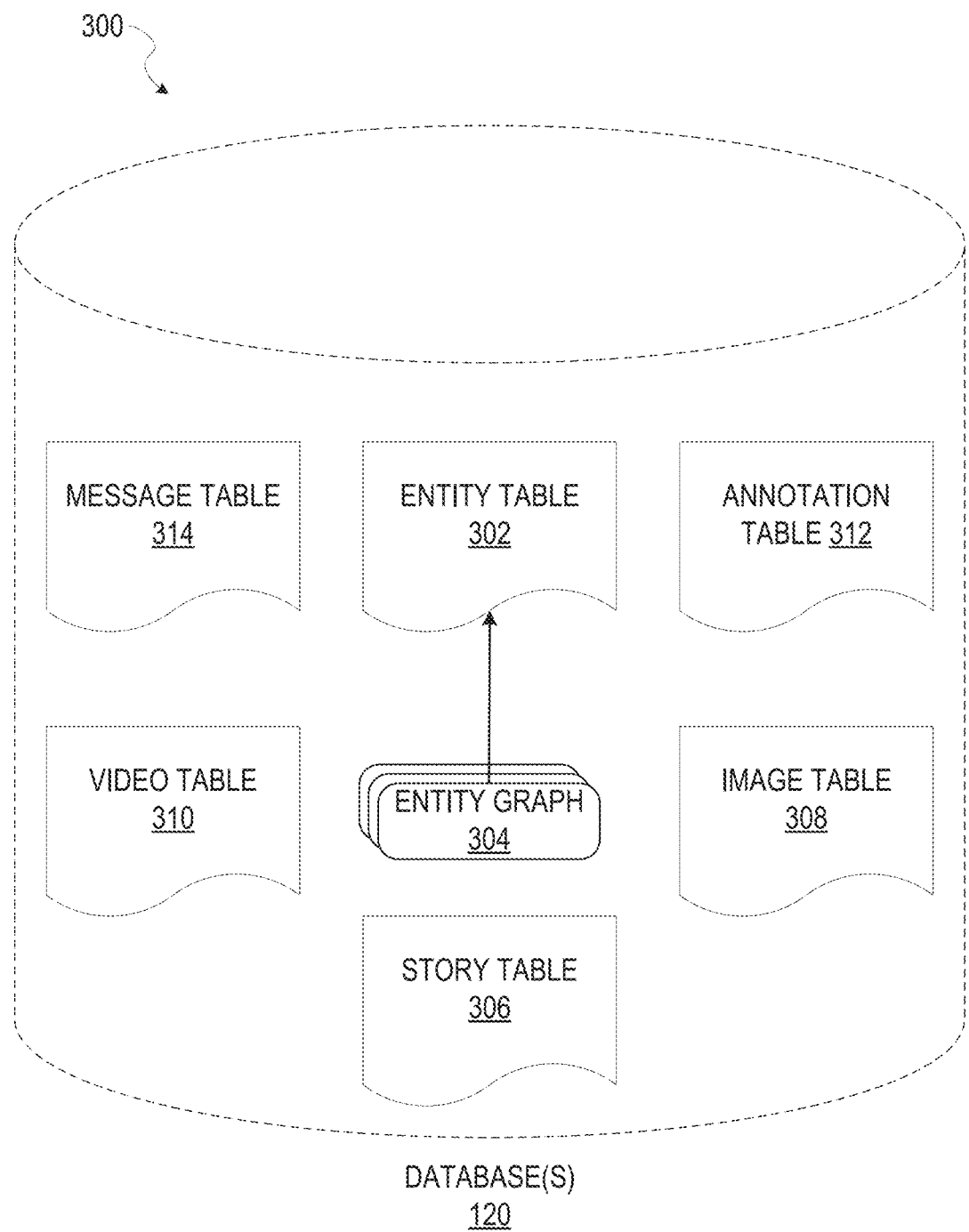
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story", which is a collection of content from multiple users that is created manually, automatically, or using a combination of manual and automatic techniques. For example, a "live story" may constitute a curated stream of user-submitted content from various locations and events. Users whose client devices have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
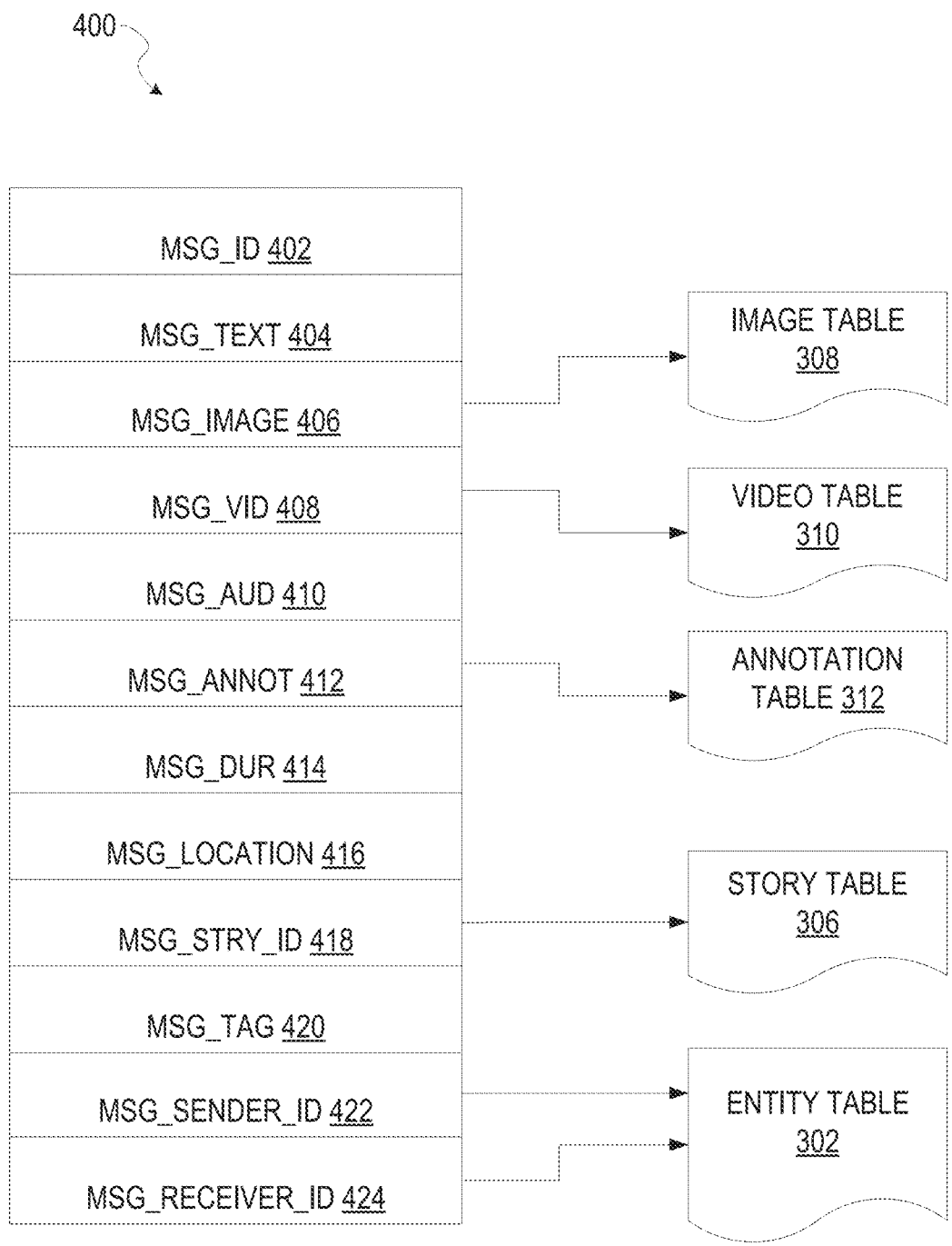
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
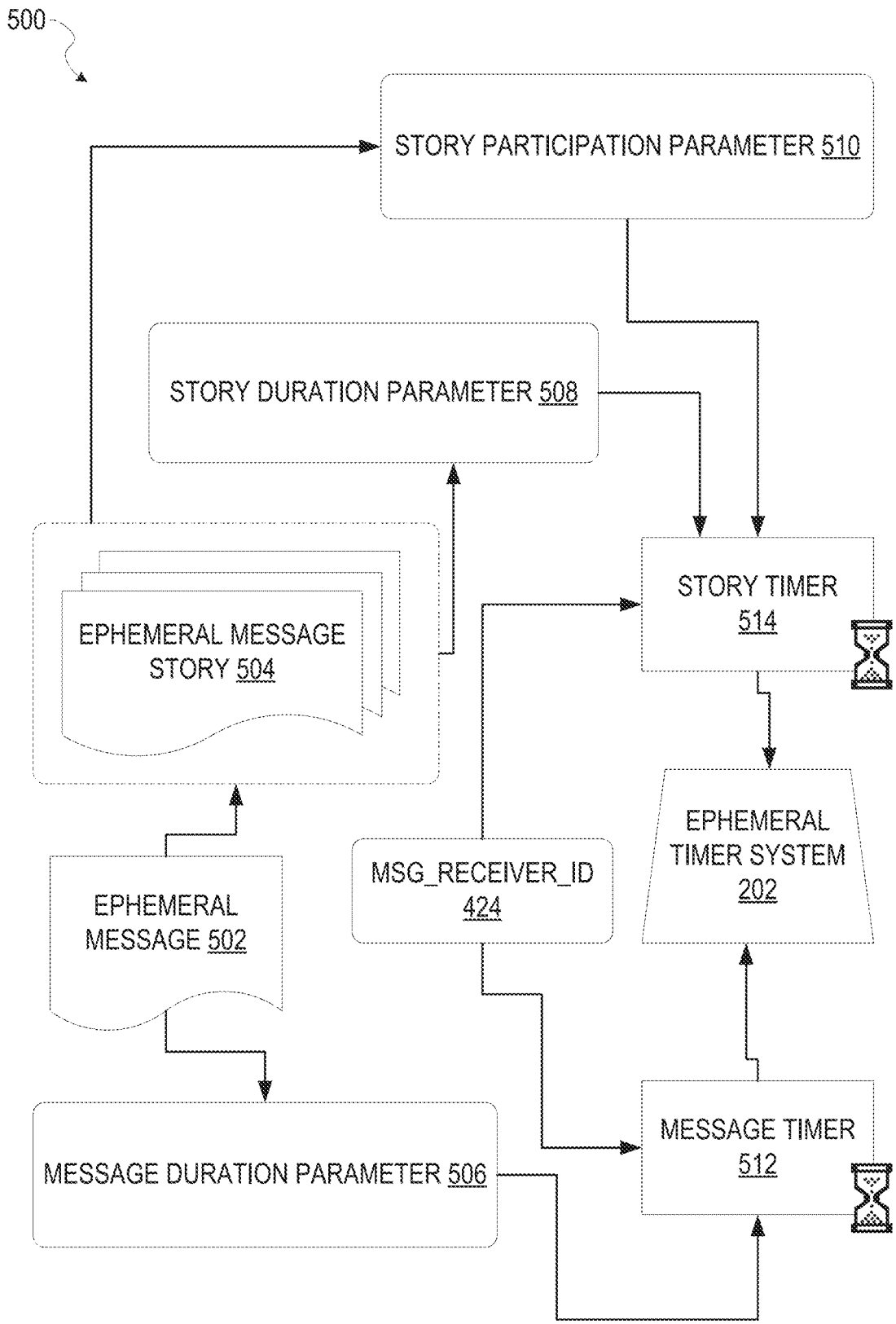
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
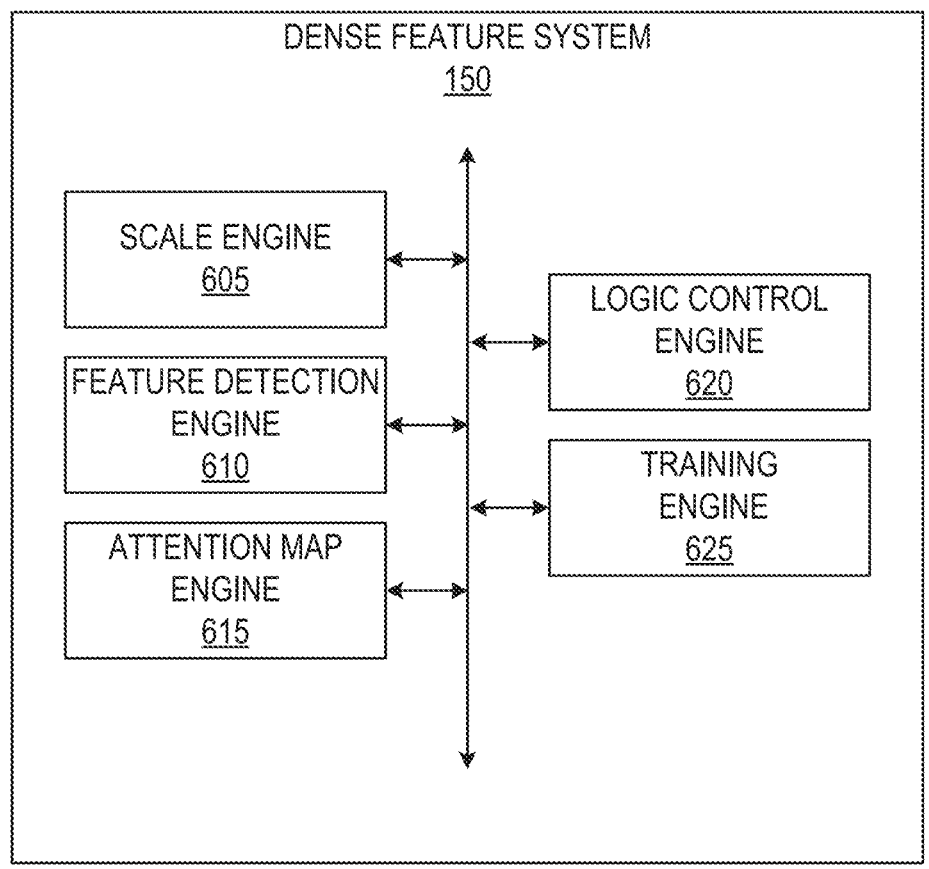
FIG. 6 illustrates a block diagram showing components provided within a dense feature system, according to some embodiments.

FIG. 6 illustrates a block diagram showing components provided within the dense feature system 150, according to some embodiments. The components themselves are communicatively coupled (e.g., via appropriate interfaces) to each other and to various data sources, so as to allow information to be passed between the applications or so as to allow the applications to share and access common data. Furthermore, the components access the database(s) 120 via the database server(s) 118. As Illustrated, the dense feature system 150 comprises a scale engine 605, a feature detection engine 610, an attention map engine 615, a logic control engine 620, and a training engine 625. The scale engine 605 is responsible for identifying an input image and generating multiple scaled images of the input image. The feature detection engine 610 manages detecting image features (e.g., edges, curves, prominences, blobs, flat surfaces) within the multiple scaled images. In some example embodiments, the feature detection engine 610 is implemented using a convolutional neural network. The attention map engine 615 is responsible for generating an attention map that is based on the texture data of each pixel of the input image. In some example embodiments the attention map engine 615 is also implemented using a convolutional neural network. The logic control engine 620 is responsible for managing the operations of the other engines and directing transfers of data between the engines. For example, the logic control engine 620 can combine feature data generated by the feature detection engine 610 with an attention map that is generated by the attention map engine 615 to track objects through different images. The training engine 625 is responsible for training the network used in the feature detection engine 610 in the attention map engine 615, according to some example embodiments.

Figure 7:
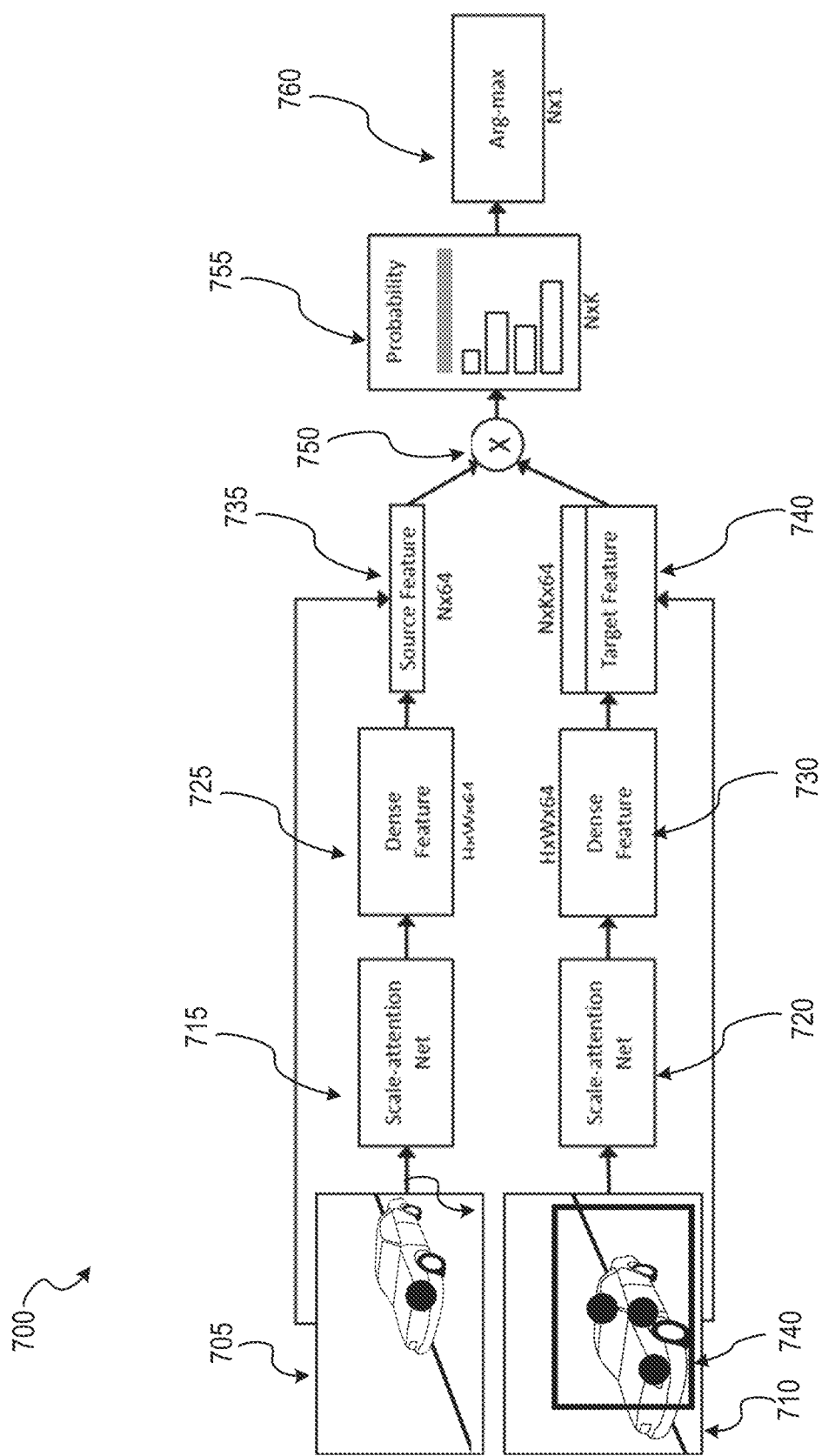
FIG. 7 illustrates a functional architecture of the dense feature system, according to some example embodiments.

FIG. 7 illustrates a functional architecture 700 of the dense feature system 150, according to some example embodiments. The two images being compared in FIG. 7 are the source image 705 and the target image 710. The source image 705 may be an image that the user has captured via the client device 102, and the target image 710 may be a stored image to be matched to the source image 705. For example, if the user takes a picture of a company's logo, the picture can be treated as the source image 705, whereas the target image 710 can then be a stored image of the logo to be matched to the source image 705. If the picture and the stored image of the logo are matched, that means the source image 705 is indeed an image of the logo.

Alternatively, in some example embodiments that implement motion estimation in a video stream, the source image 705 is a first image in the video stream and the target image 710 is the subsequent image in the video stream. By matching pixels of the source image 705 to pixels of the target image 710, motion estimation can be performed (e.g., motion estimation for interpolation effects).

With reference to the source image pipeline (e.g., objects indicated by reference numerals 705, 715, 725, and 735), the scale attention net 715 receives the source image 705 and generates a dense feature 725. The dense feature 725 is a vector that describes one or more pixels of the source image 705. Each pixel in the source image 705 is described by a dense feature 725, according to some example embodiments.

With reference to the target image pipeline (e.g., objects indicated by reference numerals 710, 720, 730, and 740), the scale attention net 720 receives the target image 710 and generates a dense feature 730.

Source feature 735 is the dense feature 725 corresponding to a feature in the source image 705. In particular, as shown in the example, the source feature 735 is a black circular area of interest on the depicted vehicle's left headlamp in the source image 705. The source feature 735 is compared against different target features in a target feature area 740 in the target image 710 (each target feature is denoted as a black filled-in circle in target feature area 740). In particular, the source feature 735 is combined with each of the target features using an inner product operation 750 to generate probability values 755. Each of the probability values 755 corresponds to a combination of the source feature 735 with one of the target features in the target feature area 740. The probability values 755 are then input into an ArgMax module 760, which selects the inner product having the largest value. It is appreciated that while source feature 735 and target features of target feature area 740 are illustrated as regions of interest (e.g., circles), the features can be individual pixels that are compared to each other (e.g., a headlight pixel from source image 705 compared against a headlight pixel from the target image 710).

Figure 8:
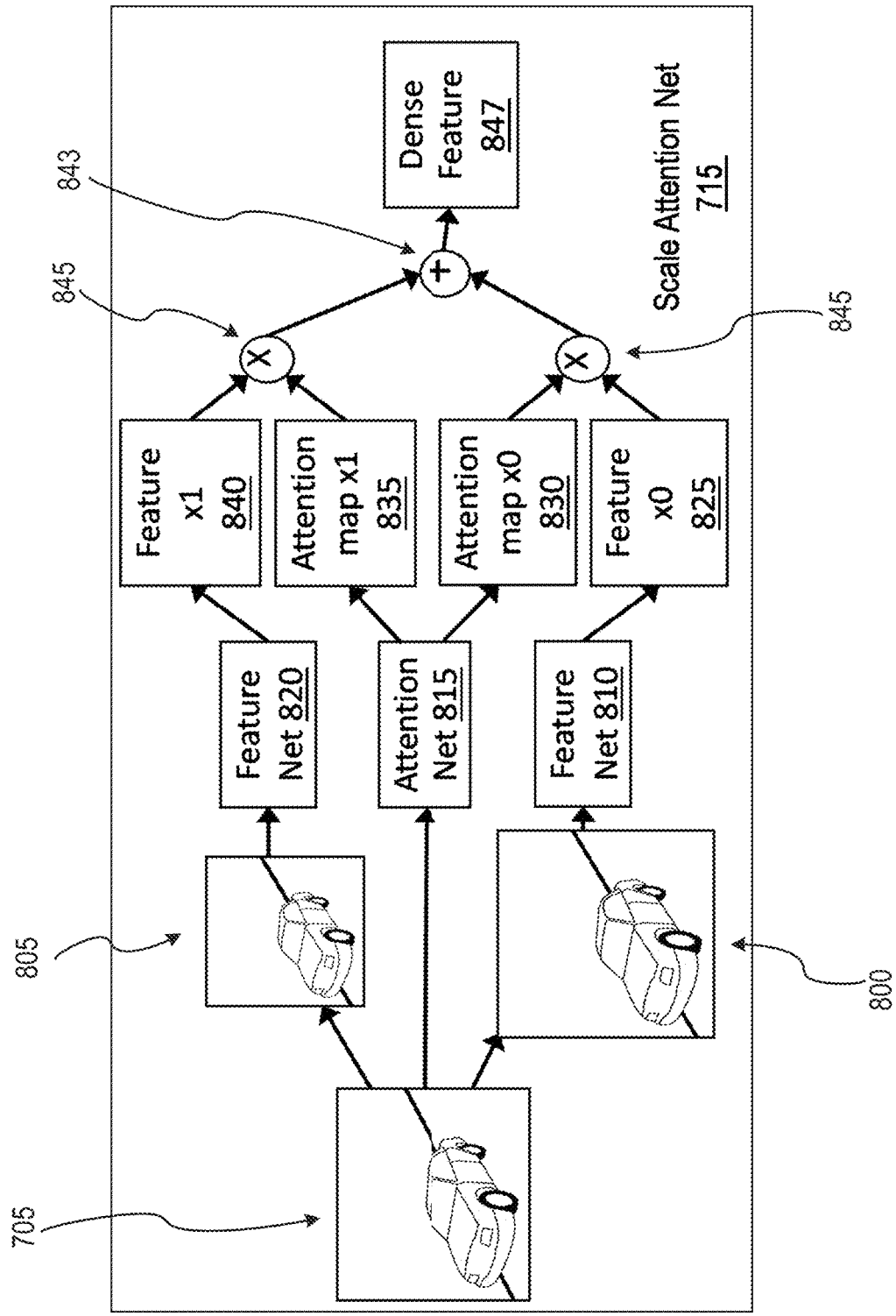
FIG. 8 shows internal functional components and processes of an attention net, according to some example embodiments.

FIG. 8 shows internal functional components and processes of a scale attention net (such as scale attention net 715 or 720, as illustrated in FIG. 7), according to some example embodiments. As illustrated, the input image is used to generate different scaled images 800 and 805, which are versions of the source image 705 at different scales (e.g., sizes, full scale, 0.75 scale, 0.5 scale). Though only two scaled images 800, 805 are illustrated, it is appreciated that many different scaled images can be produced. For example, the source image 705 can be used to generate 10 different scaled images, with the first being the full-size scale (e.g., scale of 1) and the tenth scaled image having a scale of 0.1. Each of the scaled images 800, 805 is input into a feature net, such as feature nets 810 and 820. In some example embodiments, the feature nets are implemented using convolutional neural network (CNN). The output of the feature net CNN is image feature data for a given scale. For example, feature x1 840 is feature data from the scaled image 805, and feature x0 825 is image feature data from the scaled image 800.

Figure 12A:
FIGS. 12A-12D show examples of masking pixels based on attention values at different scales, according to some example embodiments.
Figure 12B:
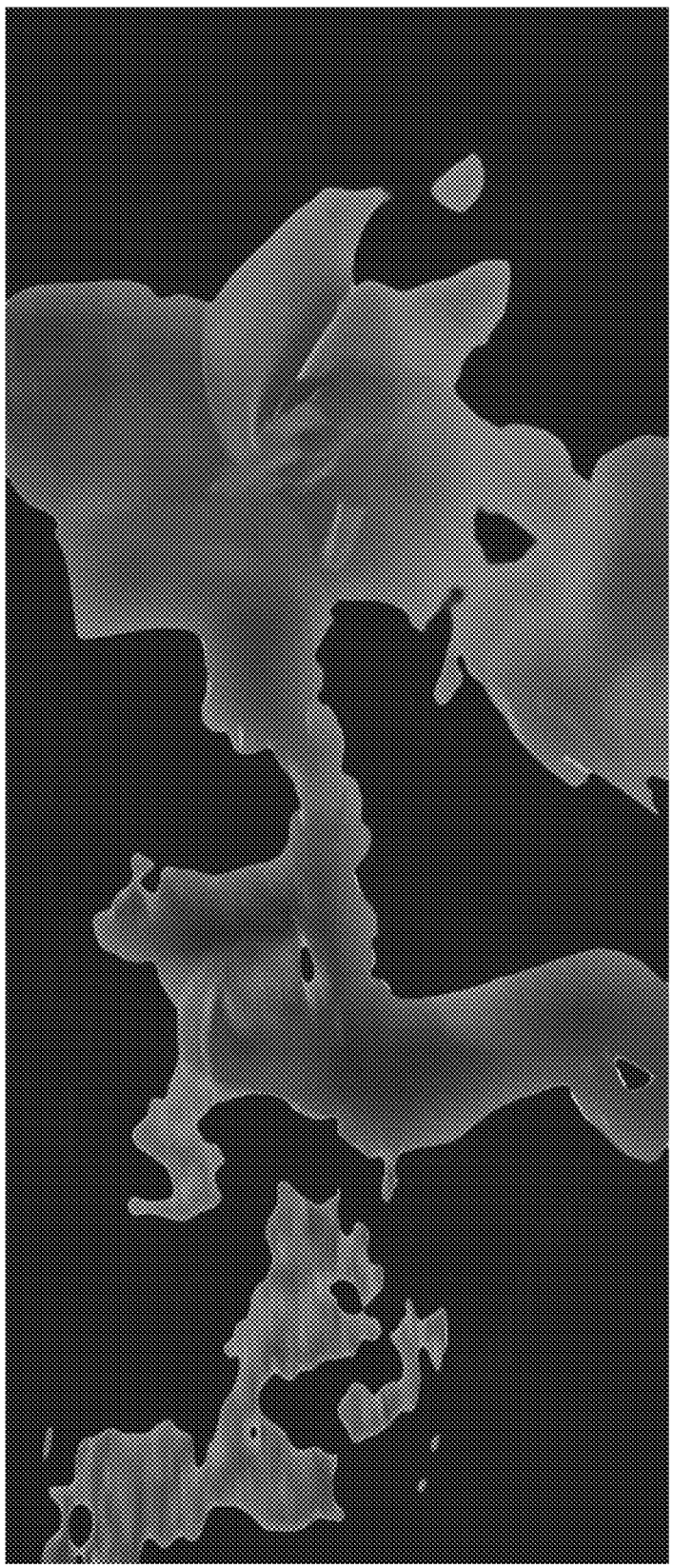

The source image 705 is also input into an attention net 815. In some example embodiments, the attention net 815 is implemented as a convolutional neural network (CNN). The attention net 815 generates attention maps, such as attention map x1 835 and attention map x0 830. In some example embodiments, the attention maps are numerical values that place more emphasis on a given scale based on the amount of texture detail of a given pixel. For example, FIG. 12A shows an example input image of two men fighting in a snowy and rocky environment. FIG. 12B shows the same image at attention with scale 1. In FIG. 12B, the attention is masked in that only pixels with the highest attention on scale 1 are shown. Each of the pixels included in FIG. 12B of attention on scale 1 have rich texture data (e.g., the fighter's beard, clothes, limbs).

Figure 12C:
Figure 12D:

Continuing, FIG. 12C, illustrates masked attention on scale 2, where only pixels with the highest attention (e.g., more texture) at scale 2 are illustrated. Similarly, FIG. 12D illustrates masked attention on scale 3, where only pixels with the highest attention (e.g., more texture) at scale 3 are illustrated. In FIG. 12D, at attention on scale 3 the background snow is included, thus background/snow feature data of an image scaled to 3 can be used with attention on scale 3 to place more emphasis on the snowy background at that scale. Whereas the men fighting, their clothes, and weapons, are included in scale 1; thus feature data of the men fighting, their clothes, and weapons can be used on scale 1 to place more emphasis on the rich textured objects at that scale (e.g., men, weapons, clothing folds, etc.).

Placing attention on different scales via the attention map improves image correlation because the size of details of different areas of an image change as the depicted object's scale changes (e.g., the image grows larger). The attention map can track the scale changes by placing different attention at different scales using textures to essentially track the object at different scales (e.g., different sizes). In this way, the dense feature system 150 emphasizes rich texture areas (e.g., beard, clothes) at a small scale but emphasizes larger areas (e.g., areas with less texture or details such as snow)

at larger scales. Further details of the attention net are discussed with reference to FIG. 10 below.

Referring to FIG. 8., the feature data x1 840 is then combined with the attention map x1 835 via a multiplication operation 845. Similarly, the attention map x0 830 is combined with feature x0 825 via multiplication operation 845. Attention map x0 830 has different values than attention map x1 835. In particular, attention map x1 835 places more emphasis on textured features for the scale of scaled image 805, and attention map x0 830 places more emphasis on textured features of the scale of scaled image 800.

The values of the attention maps (e.g., the value of attention map x1 835 and attention map x0 830) is adjusted during a training phase, according to some example embodiments. During the training phase the weighted connections of the convolutional neural network are adjusted (e.g., via back propagation) to maximize the inner product between a dense feature in the source image and its counterpart dense feature in the target image. Next, according to some example embodiments, all combinations of feature and attention data is combined in a weighted sum via addition operation 843 to produce dense feature 847, which is a collection of all dense features for all pixels.

Figure 9:
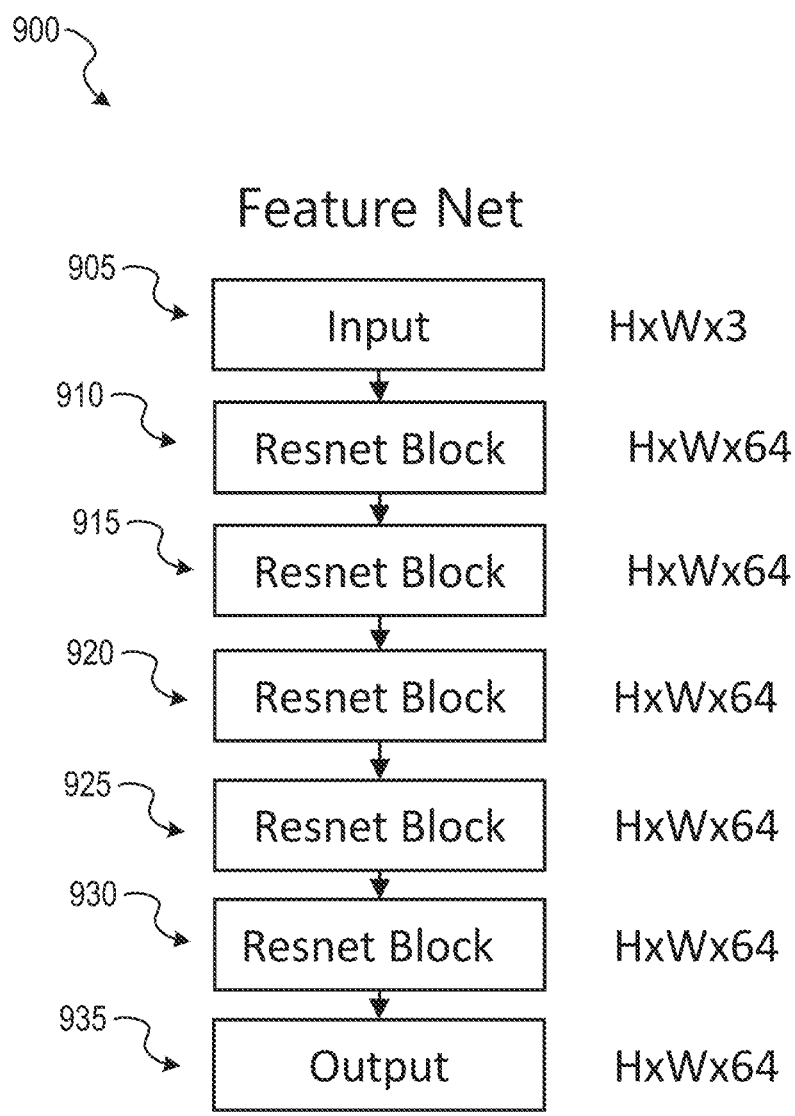
FIG. 9 illustrates an example architecture of a feature net, according to some example embodiments.
Figure 11:
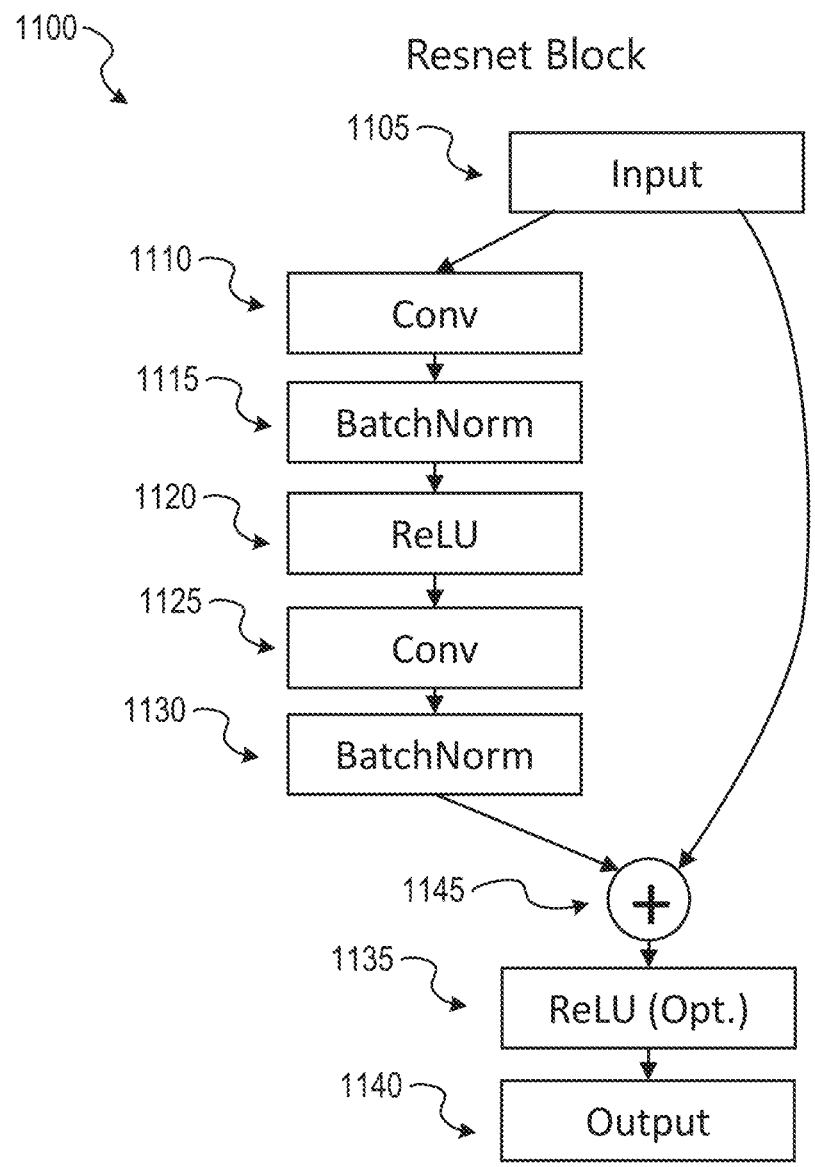
FIG. 11 shows internal components of a resnet block, as according to some example embodiments.

FIG. 9 illustrates an architecture for a feature net 900, according to some example embodiments. In the example in FIG. 9, the feature net 900 is implemented as a number of layers of a convolutional neural network. In particular, the feature net 900 comprises an input layer 905, which receives the input image, resnet block 910, resnet block 915, resnet block 920, resnet block 925, resnet block 930, and an output layer 935, which outputs the feature data for the given scale. FIG. 11, discussed below, shows an example of a layers inside a resnet block (e.g., any one of resnet blocks 910-930). In some example embodiments, the last resnet block of the feature net 900 (e.g., resent block 930) does not have a REctified Linear Unit (RELU) layer as shown in FIG. 11 below.

Figure 10:
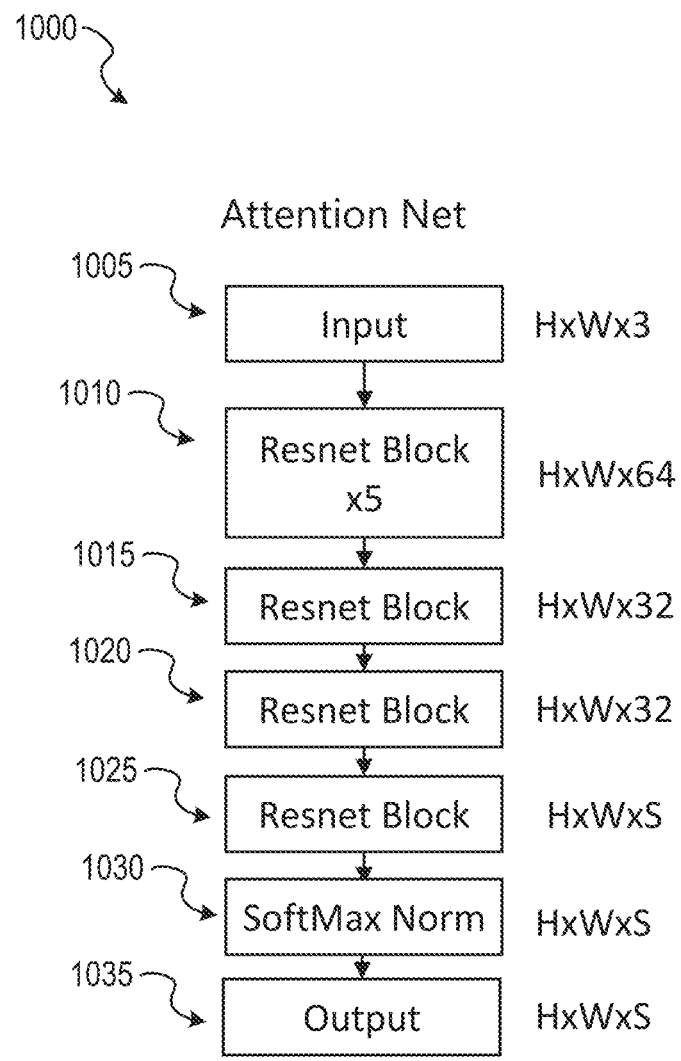
FIG. 10 illustrates an example architecture of an attention net, according to some example embodiments.

FIG. 10 illustrates an architecture for an attention net 1000, according to some example embodiments. In the example of FIG. 10, the attention net 1000 is implemented as a number of layers of a convolutional neural network. In particular, the attention net comprises an input layer 1005, a shared resnet block layer 1010, resnet block layer 1015, resnet block layer 1020, resnet block layer 1025, a SoftMax norm block layer 1030, and an output layer 1035. As illustrated, the shared resnet block layer 1010 shares the same parameter data as the five resnet blocks 910-930 of the feature net 900 (e.g., the attention net 1000 and the feature net 900 use the same five resnet blocks). In some example embodiments, the last resnet block of the attention net 1000 (e.g., resent block 1025) does not have a RELU layer as shown in FIG. 11 below.

FIG. 11 shows example internal components of a resnet block 1100, as according to some example embodiments. In particular, with reference to FIG. 11, resnet block comprises an input layer 1105, a convolutional layer 1110, a batch norm layer 1115, a RELU layer 1120, a convolution layer 1125, and a batch norm layer 1130. A skip connection from the input can be combined with the output of the batch norm layer 1130 via an additive operator 1145. The output from the additive operator 1145 is then input to an optional RELU layer 1135, and into an output layer 1140, which outputs the data for resnet block 1100. As discussed above, in some example embodiments, the last resnet block of the feature net and attention net do not include a RELU layer, e.g., RELU layer 1135.

Figure 13:
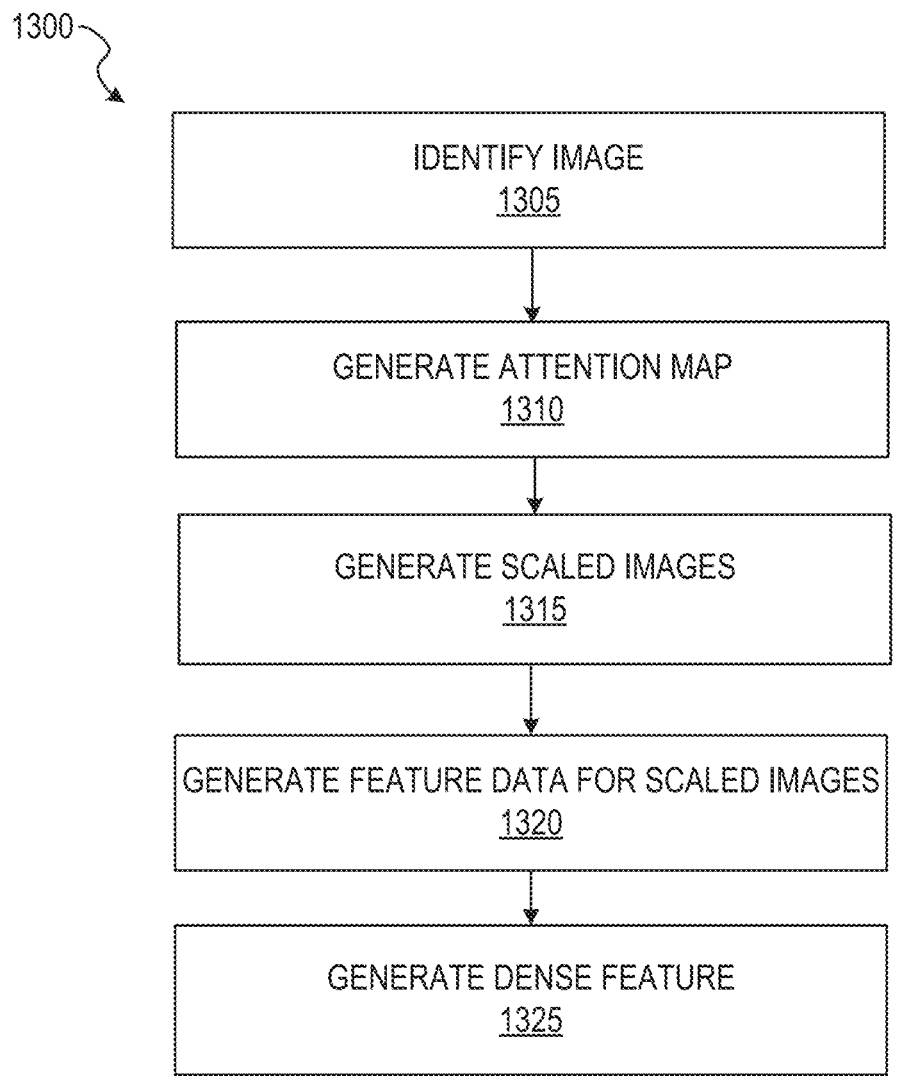
FIG. 13 illustrates a flow diagram of a method for generating dense feature data, according to some example embodiments.

FIG. 13 illustrates a flow diagram for a method 1300 for generating dense feature data, according to some example embodiments. At operation 1305, the logic control engine 620 identifies the input image (e.g., source image 705). At operation 1310, the attention map engine 615 generates an attention map for combination with one or more feature data sets generated from different scaled images. At operation 1315, the scale engine 605 uses the input image to generate multiple scaled images having different scales. At operation 1320, for each of the generated scaled images, the feature detection engine 610 generates feature data (e.g., feature x1 840, feature x0 825 in FIG. 8). At operation 1325, the logic control engine 620 combines (e.g., multiplies) feature data of a given scale with an attention map for the given scale, and further combines all combinations of attention maps and feature data using a summation operation (e.g., addition operation 843). The result of operation 1325 is dense feature data for the input image (e.g., dense feature 847).

Figure 14:
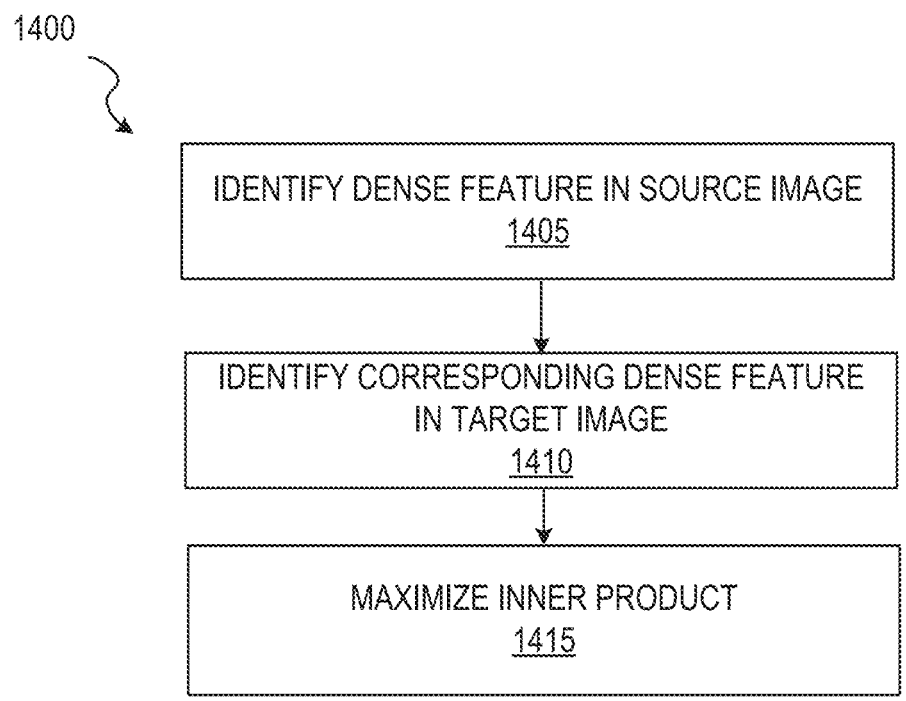
FIG. 14 illustrates a flow diagram for a method for training a dense feature system, according to some example embodiments

FIG. 14 illustrates a flow diagram for a method 1400 for training the dense feature system 150, according to some example embodiments. At operation 1405, the training engine 625 identifies the dense feature in the source image. For example, the training engine 625 identifies source feature 735 in source image 705. At operation 1410, the training engine 626 identifies the corresponding dense feature in the target image. For example, the training engine 625 identifies the target feature over the headlight (e.g., within target feature area 740).

To train the dense feature system 150, the training engine 626 modifies the weights of neuron connections and neuron values until the inner product of the source feature and the target feature are at a maximum. Accordingly, at operation 1415, the training engine 625 maximizes the inner product between the source feature and the target feature to maximize the likelihood of those two features producing the greatest inner product. During the training process, the final output function, e.g., ArgMax module 760, is replaced by a SoftMax module, which compares the source features by classifying them. Further, during the training process, as mentioned above, the attention net is trained for the different scales and the appropriate attention map can be set to focus on different scales.

Figure 15:
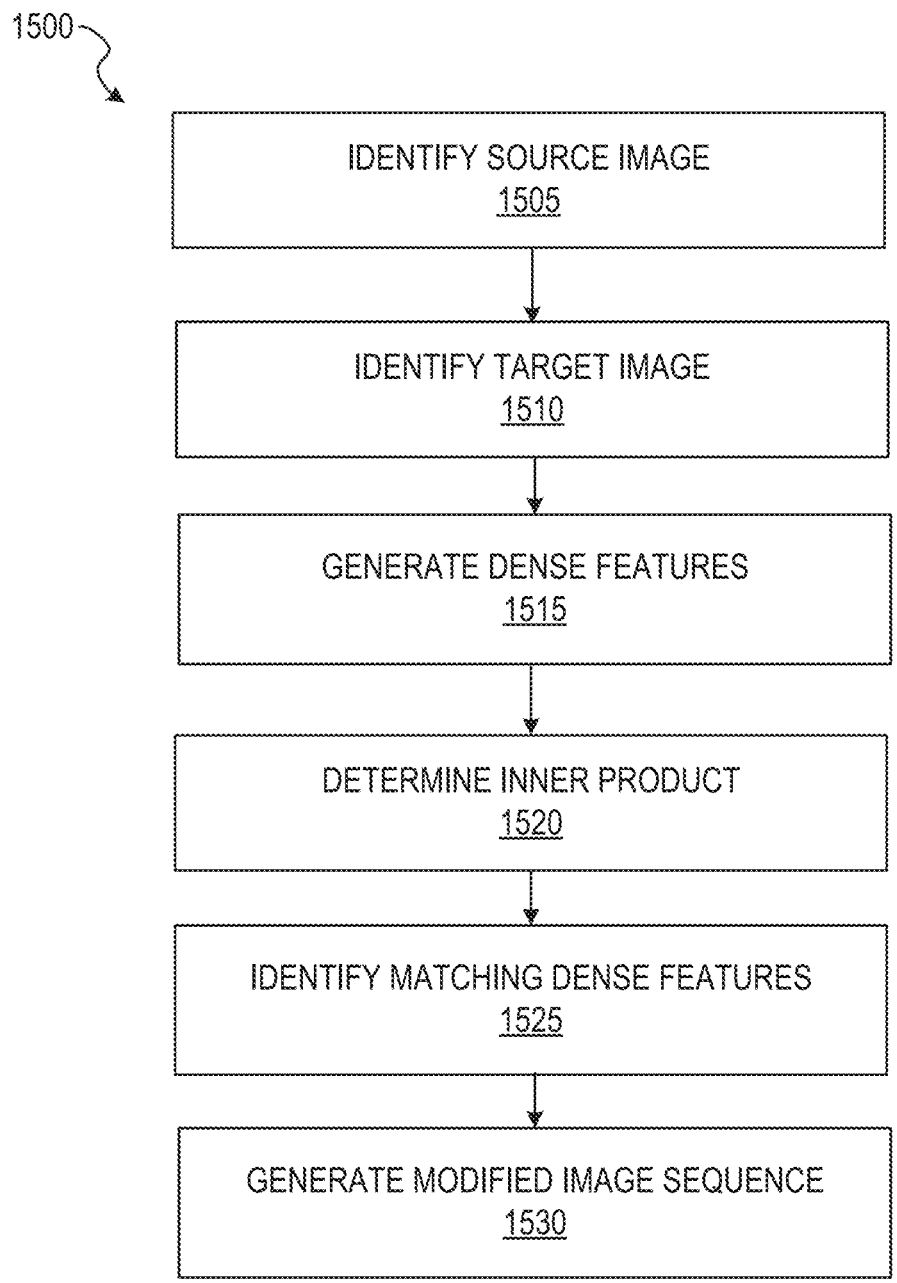
FIG. 15 illustrates a flow diagram for a method for matching pixels in different images, according to some example embodiments.

FIG. 15 illustrates a flow diagram for a method 1500 for matching pixels in different images, according to some example embodiments. For example, the pixels being matched in FIG. 15 can be pixels of an object changing size (e.g., scale) in two images, a source image and a target image. At operation 1505, the logic control engine 620 identifies the source image. The source image may be an initial frame sampled from a live video feed being captured on the client device. At operation 1510, the logic control engine 620 identifies the target image. The target image may be a frame from the live video feed captured after the source image, for example. At operation 1515, the logic control engine 620 implements a scale-attention net to generate dense feature data for the source image and the target image. For example, the logic control engine 620 can implement a scale-attention net by combining outputs from the scale engine 605, the feature detection engine 610, and the attention map engine 615 as described above with reference to FIGS. 7 and 8. At operation 1520, the logic control engine 620 determines the inner products between the dense features of the source and target images. At operation 1525, the logic control engine 620 identifies matching dense feature by identifying which combinations of dense features have the greatest inner products. At operation 1530, the logic control engine 620 generates a modified image sequence at least in part by using the dense feature to track an object depicted in an image sequence. For example, the object being tracked may be a car being video recorded on the client device 102. The dense feature can more accurately and efficiently track the car on the client device and change the color of the car via pixel manipulation. The image sequence depicting the car with a different color can then be published as an ephemeral message 502, as discussed above with reference to FIG. 5.

Figure 16:
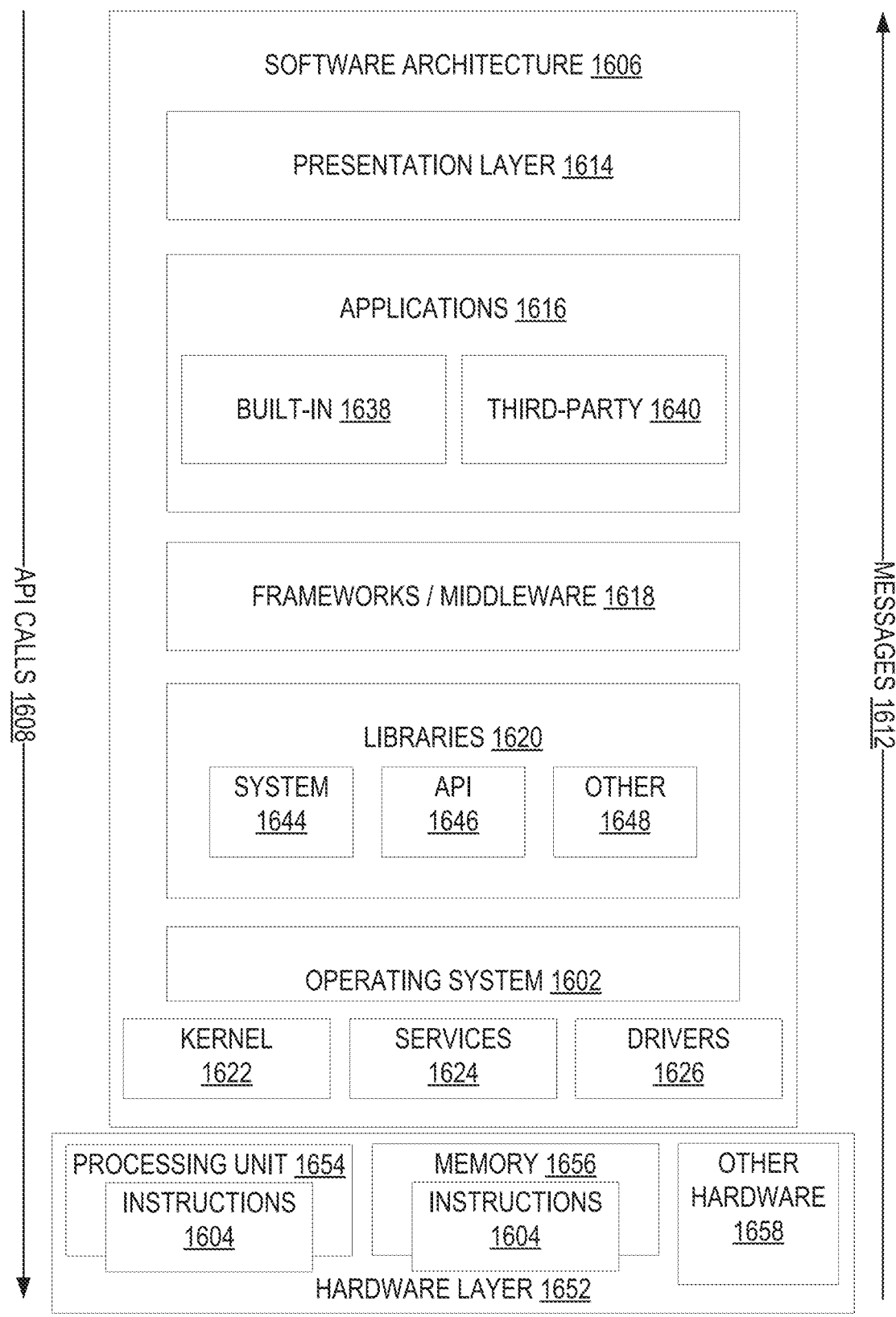
FIG. 16 is a block diagram illustrating a representative software architecture, which may be used in conjunction with various hardware architectures herein described.

FIG. 16 is a block diagram illustrating an example software architecture 1606, which may be used in conjunction with various hardware architectures herein described. FIG. 16 is a non-limiting example of a software architecture, and it will be appreciated that many other architectures may be implemented to facilitate the functionality described herein. The software architecture 1606 may execute on hardware such as a machine 1600 of FIG. 16 that includes, among other things, processors, memory, and I/O components. A representative hardware layer 1652 is illustrated and can represent, for example, the machine 1600 of FIG. 16. The representative hardware layer 1652 includes a processing unit 1654 having associated executable instructions 1604. The executable instructions 1604 represent the executable instructions of the software architecture 1606, including implementation of the methods, components, and so forth described herein. The hardware layer 1652 also includes a memory/storage 1656, which also has the executable instructions 1604. The hardware layer 1652 may also comprise other hardware 1658.

In the example architecture of FIG. 16, the software architecture 1606 may be conceptualized as a stack of layers where each layer provides particular functionality. For example, the software architecture 1606 may include layers such as an operating system 1602, libraries 1620, frameworks/middleware 1618, applications 1616, and a presentation layer 1614. Operationally, the applications 1616 and/or other components within the layers may invoke application programming interface (API) calls 1608 through the software stack and receive a response in the form of messages 1612. The layers illustrated are representative in nature and not all software architectures have all layers. For example, some mobile or special-purpose operating systems may not provide a frameworks/middleware 1618, while others may provide such a layer. Other software architectures may include additional or different layers.

The operating system 1602 may manage hardware resources and provide common services. The operating system 1602 may include, for example, a kernel 1622, services 1624, and drivers 1626. The kernel 1622 may act as an abstraction layer between the hardware and the other software layers. For example, the kernel 1622 may be responsible for memory management, processor management (e.g., scheduling), component management, networking, security settings, and so on. The services 1624 may provide other common services for the other software layers. The drivers 1626 are responsible for controlling or interfacing with the underlying hardware. For instance, the drivers 1626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1620 provide a common infrastructure that is used by the applications 1616 and/or other components and/or layers. The libraries 1620 provide functionality that allows other software components to perform tasks in an easier fashion than by interfacing directly with the underlying operating system 1602 functionality (e.g., kernel 1622, services 1624, and/or drivers 1626). The libraries 1620 may include system libraries 1644 (e.g., C standard library) that may provide functions such as memory allocation functions, string manipulation functions, mathematical functions, and the like. In addition, the libraries 1620 may include API libraries 1646 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1620 may also include a wide variety of other libraries 1648 to provide many other APIs to the applications 1616 and other software components/modules.

The frameworks/middleware 1618 provide a higher-level common infrastructure that may be used by the applications 1616 and/or other software components/modules. For example, the frameworks/middleware 1618 may provide various graphic user interface (GUI) functions, high-level resource management, high-level location services, and so forth. The frameworks/middleware 1618 may provide a broad spectrum of other APIs that may be utilized by the applications 1616 and/or other software components/modules, some of which may be specific to a particular operating system 1602 or platform.

The applications 1616 include built-in applications 1638 and/or third-party applications 1640. Examples of representative built-in applications 1638 may include, but are not limited to, a contacts application, a browser application, a book reader application, a location application, a media application, a messaging application, and/or a game application. The third-party applications 1640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1640 may invoke the API calls 1608 provided by the mobile operating system (such as the operating system 1602) to facilitate functionality described herein.

The applications 1616 may use built-in operating system functions (e.g., kernel 1622, services 1624, and/or drivers 1626), libraries 1620, and frameworks/middleware 1618 to create user interfaces to interact with users of the system. Alternatively, or additionally, in some systems interactions with a user may occur through a presentation layer, such as the presentation layer 1614. In these systems, the application/component "logic" can be separated from the aspects of the application/component that interact with a user.

Figure 17:
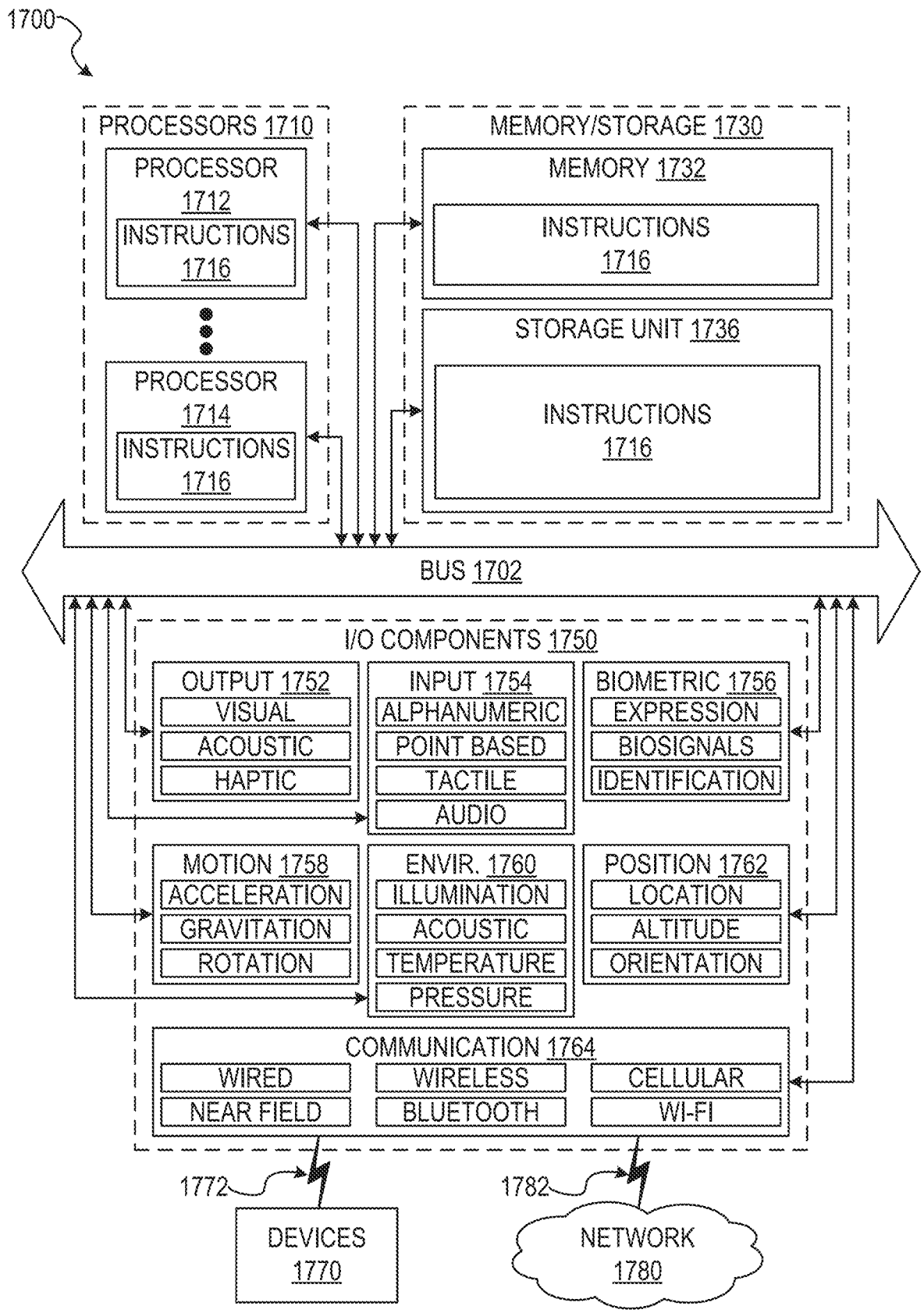
FIG. 17 is a block diagram illustrating components of a machine, according to some example embodiments, able to read instructions from a machine-readable medium (e.g., a machine-readable storage medium) and perform any one or more of the methodologies discussed herein.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. As such, the instructions 1716 may be used to implement modules or components described herein. The instructions 1716 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines that individually or jointly execute the instructions 1716 to perform any one or more of the methodologies discussed herein.

The machine 1700 may include processors 1710, memory/storage 1730, and I/O components 1750, which may be configured to communicate with each other such as via a bus 1702. The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1700. Accordingly, the memory 1732, the storage unit 1736, and the memory of the processors 1710 are examples of machine-readable media.

The I/O components 1750 may include a wide variety of components to receive input, provide output, produce output, transmit information, exchange information, capture measurements, and so on. The specific I/O components 1750 that are included in a particular machine 1700 will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environment components 1760, or position components 1762 among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1758 may include acceleration sensor components (e.g., accelerometer), gravitation sensor components, rotation sensor components (e.g., gyroscope), and so forth. The environment components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772 respectively. For example, the communication components 1764 may include a network interface component or other suitable device to interface with the network 1780. In further examples, the communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component")

should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAP INC., All Rights Reserved.

What is claimed is:

1. A method comprising:
    identifying a source image having a source dense feature;
    identifying a target image having a target dense feature;
    training, using one or more processors of a machine, one or more convolutional neural networks by maximizing a product of the source dense feature and the target dense feature;
    generating dense features by combining image features that are generated with the one or more convolutional neural networks with attention values of an attention map that is generated with the one or more convolutional neural networks; and
    identifying, using the dense features, a location of an object depicted in a sequence of images.

2. The method of claim 1 further comprising:
    generating the image features for a plurality of scaled images of an image using the one or more convolutional neural networks; and
    generating the attention map based on texture data of pixels of the image using the one or more convolutional neural networks.

3. The method of claim 1, further comprising:
    identifying an image;
    generating a plurality of scaled images from the image; and
    generating the image features for the plurality of scaled images of the image using the one or more convolutional neural networks.

4. The method of claim 1, further comprising:
    generating the attention values of the attention map, the attention values being one or more numerical values that modify values of the dense features based at least in part on a scale of a plurality of scaled images of an image.

5. The method of claim 4, wherein the attention values are a range of numerical values in a distribution, and wherein the image features are combined using a multiplication operation.

6. The method of claim 4, wherein the plurality of scaled images comprises a first scaled image and a second scaled image, wherein the first scaled image is used to generate a first set of attention values and a first image feature dataset, wherein the second scaled image is used to generate a second set of attention values and a second image feature dataset.

7. The method of claim 6, wherein the first set of attention values and the first image feature dataset are multiplied together to produce a first multiplication output,
wherein the second set of attention values and the second image feature dataset are multiplied together to produce a second multiplication output,
wherein the method further comprises: summing the first multiplication output and the second multiplication output to generate a dense feature dataset, wherein the dense feature dataset comprises a plurality of vectors for a plurality of pixels of the image.

8. The method of claim 1, further comprising:
generating a sequence of modified images from the sequence of images using the location of the object in the sequence of images.

9. The method of claim 8, further comprising:
storing, in a memory of the machine, the location of the object within each image of the sequence of images.

10. The method of claim 8, further comprising:
publishing the sequence of modified images on a social network site as an electronic message.

11. A system comprising:
one or more processors of a machine; and
a memory storing instructions that, when executed by the one or more processors, cause the machine to perform operations comprising:
identifying a source image having a source dense feature;
identifying a target image having a target dense feature;
training, using one or more processors of a machine, one or more convolutional neural networks by maximizing a product of the source dense feature and the target dense feature;
generating dense features by combining image features that are generated with the one or more convolutional neural networks with attention values of an attention map that is generated with the one or more convolutional neural networks; and
identifying, using the dense features, a location of an object depicted in a sequence of images.

12. The system of claim 11, wherein the operations further comprise:
generating the image features for a plurality of scaled images of an image using the one or more convolutional neural networks; and
generating the attention map based on texture data of pixels of the image using the one or more convolutional neural networks.

13. The system of claim 11, wherein the operations further comprise:
identifying an image;
generating a plurality of scaled images from the image; and
generating the image features for the plurality of scaled images of the image using the one or more convolutional neural networks.

14. The system of claim 11, wherein the operations further comprise:
generating the attention values of the attention map, the attention values being one or more numerical values that modify values of the dense features based at least in part on a scale of a plurality of scaled images of an image.

15. The system of claim 14, wherein the attention values are a range of numerical values in a distribution, and wherein the image features are combined using a multiplication operation.

16. The system of claim 14, wherein the plurality of scaled images comprises a first scaled image and a second scaled image, wherein the first scaled image is used to generate a first set of attention values and a first image feature dataset, wherein the second scaled image is used to generate a second set of attention values and a second image feature dataset.

17. The system of claim 16, wherein the first set of attention values and the first image feature dataset are multiplied together to produce a first multiplication output,
wherein the second set of attention values and the second image feature dataset are multiplied together to produce a second multiplication output,
wherein the operations further comprise: summing the first multiplication output and the second multiplication output to generate a dense feature dataset, wherein the dense feature dataset comprises a plurality of vectors for a plurality of pixels of the image.

18. The system of claim 11, wherein the operations further comprise:
generating a sequence of modified images from the sequence of images using the location of the object in the sequence of images.

19. The system of claim 18, wherein the operations further comprise:
storing, in a memory of the machine, the location of the object within each image of the sequence of images; and
publishing the sequence of modified images on a social network site as an electronic message.

20. A non-transitory machine-readable storage device embodying instructions that, when executed by a machine, cause the machine to perform operations comprising:
identifying a source image having a source dense feature;
identifying a target image having a target dense feature;
training, using one or more processors of a machine, one or more convolutional neural networks by maximizing a product of the source dense feature and the target dense feature;
generating dense features by combining image features that are generated with the one or more convolutional neural networks with attention values of an attention map that is generated with the one or more convolutional neural networks; and
identifying, using the dense features, a location of an object depicted in a sequence of images.

* * * * *